Figure 1:
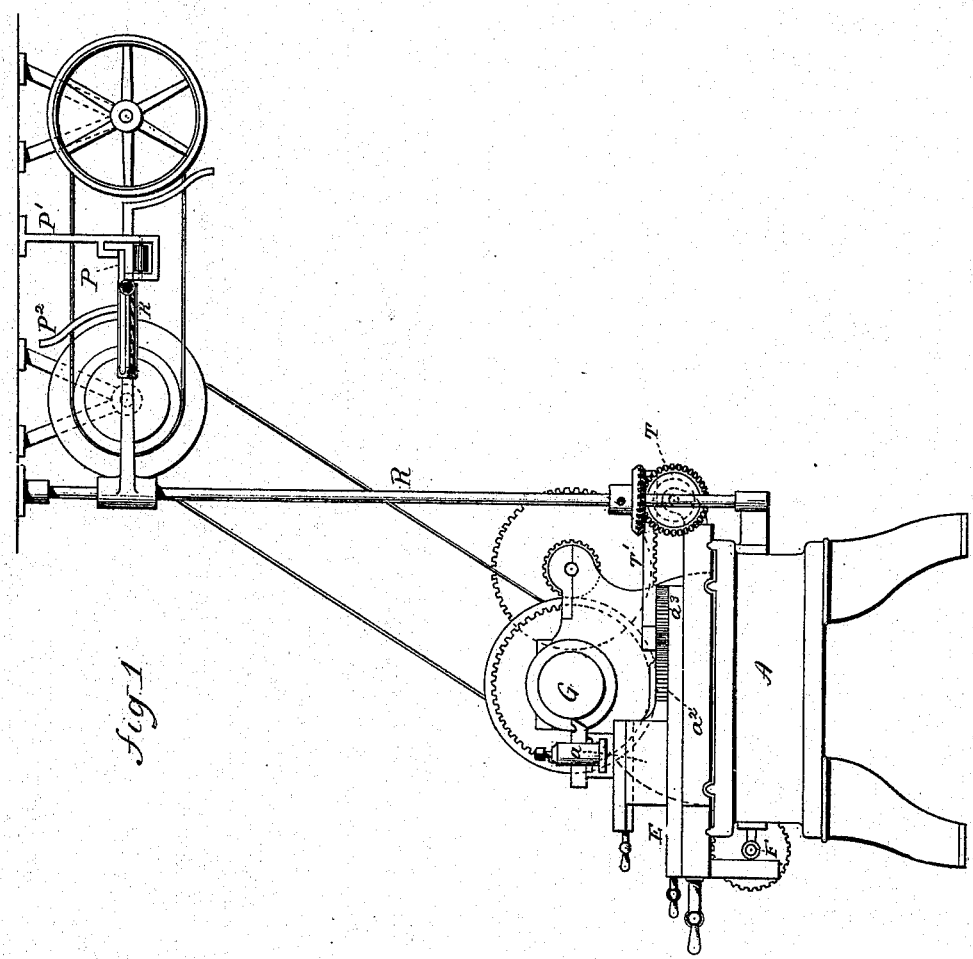

(No Model.) 4 Sheets—Sheet 1.

H. LORD.
MECHANICAL MOVEMENT.

No. 252,231. Patented Jan. 10, 1882.

Witnesses:
J. H. Shumway
Jos. C. Earle

Horace Lord Inventor
By Atty.
John Earle

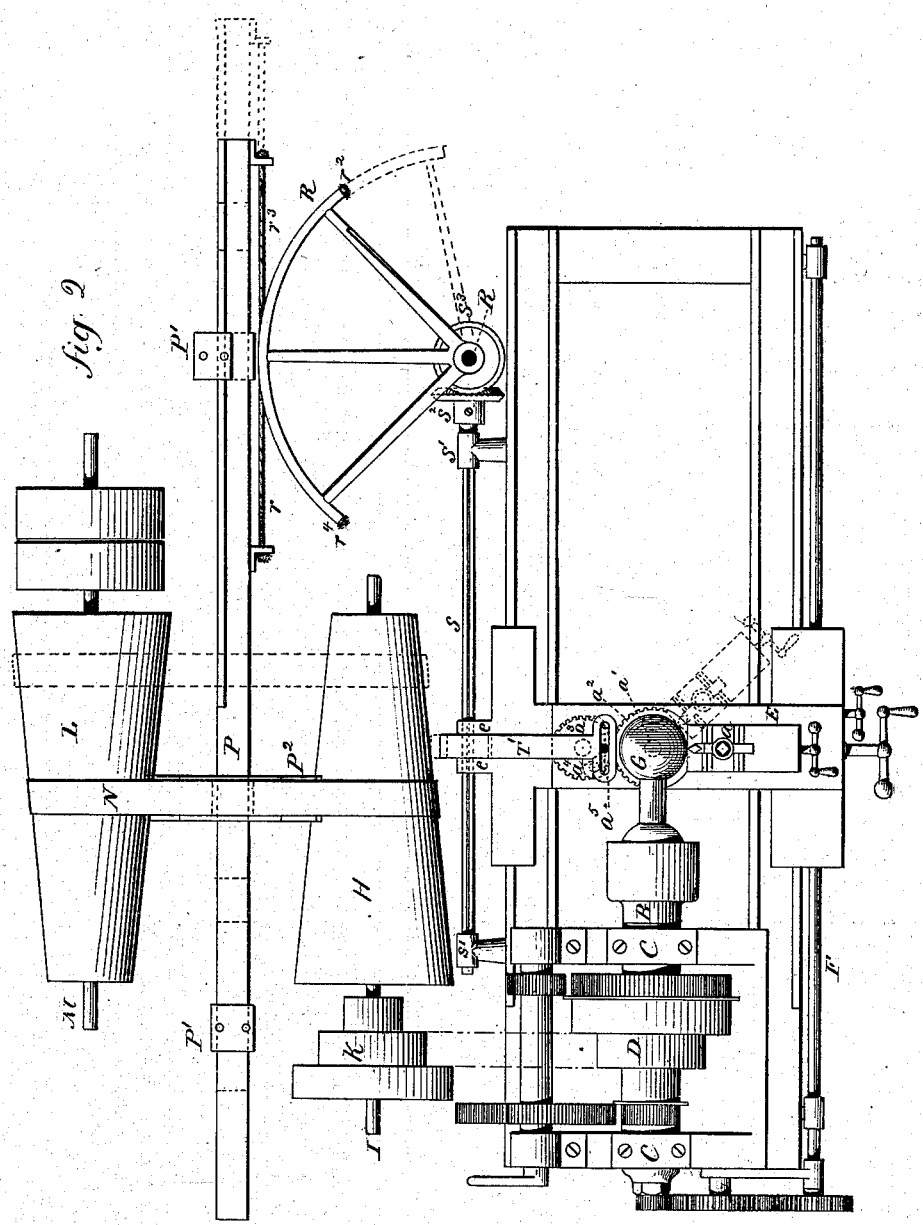

(No Model.) 4 Sheets—Sheet 3.
H. LORD.
MECHANICAL MOVEMENT.
No. 252,231. Patented Jan. 10, 1882.
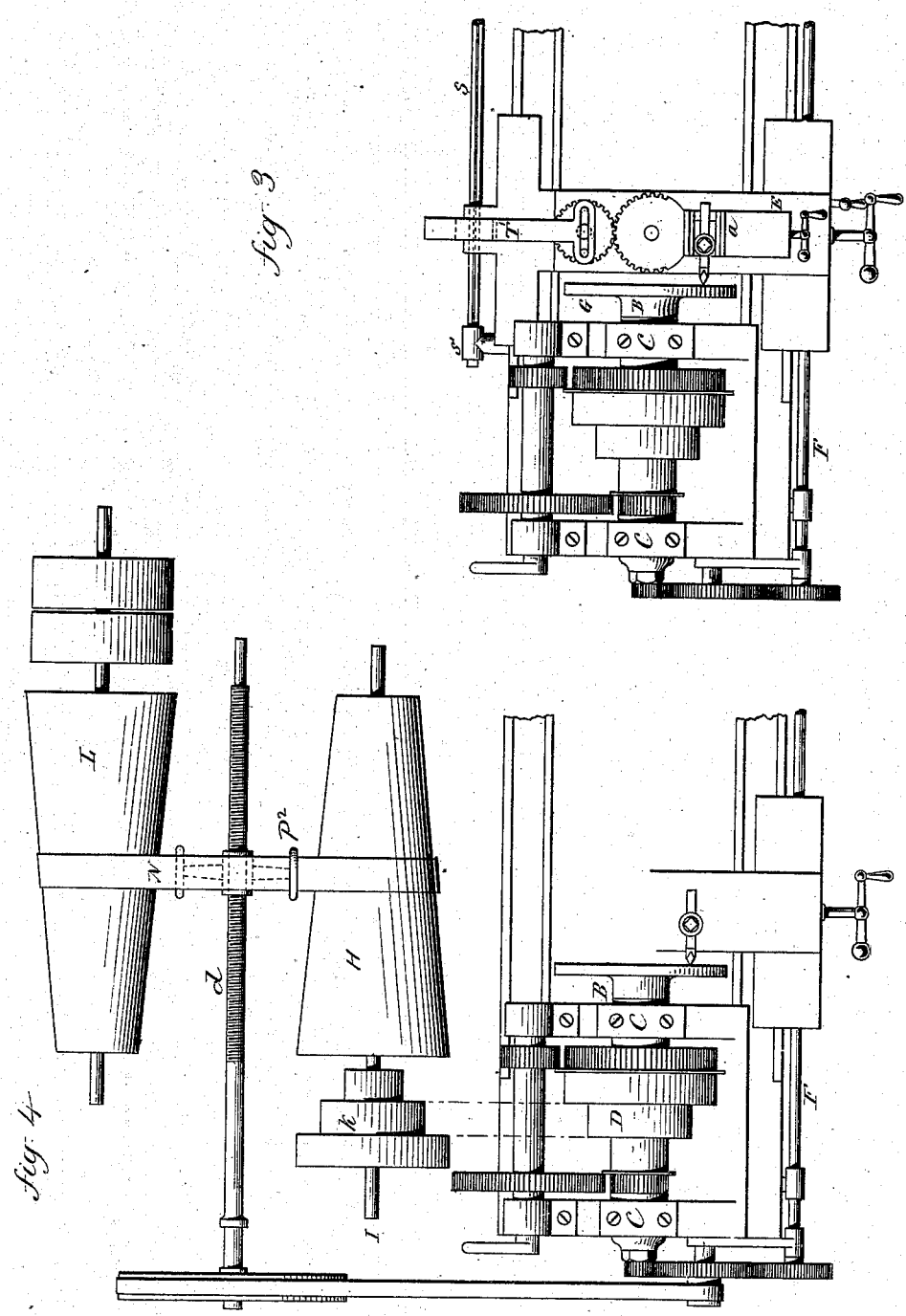

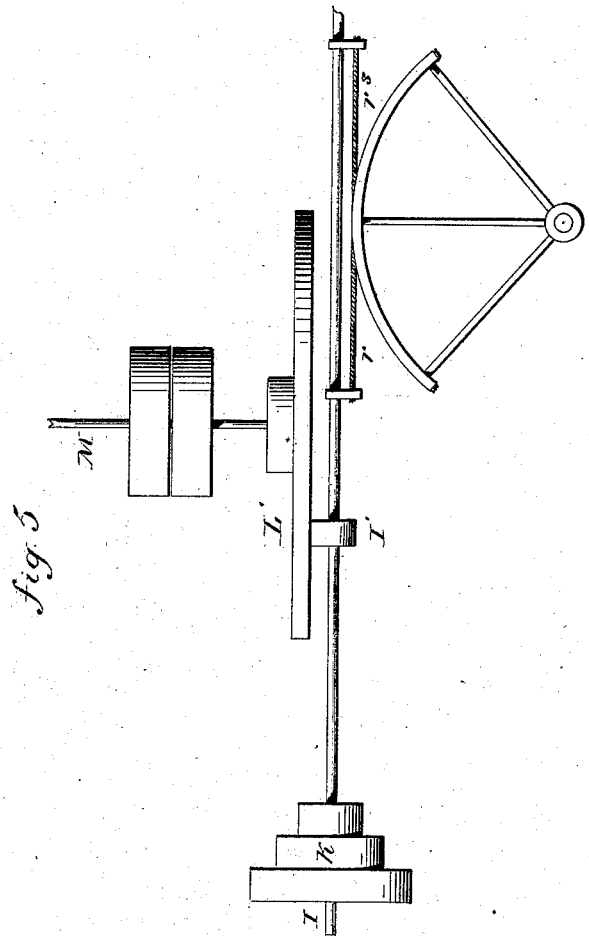

UNITED STATES PATENT OFFICE.

HORACE LORD, OF HARTFORD, CONNECTICUT, ASSIGNOR TO THE COLTS PATENT FIRE-ARMS MANUFACTURING COMPANY, OF SAME PLACE.

MECHANICAL MOVEMENT.

SPECIFICATION forming part of Letters Patent No. 252,231, dated January 10, 1882.

Application filed December 15, 1881. (No model.)

*To all whom it may concern:*

Be it known that I, HORACE LORD, of Hartford, in the county of Hartford and State of Connecticut, have invented a new Improvement in Mechanical Movement to vary the speed of a revolving surface with relation to a tool working upon said surface; and I do hereby declare the following, when taken in connection with the accompanying drawings and the letters of reference marked thereon, to be a full, clear, and exact description of the same, and which said drawings constitute part of this specification, and represent, in—

Figure 1, an end view; Fig. 2, a plan view;
Figs. 3 and 4, modifications.

This invention relates to a device for adjusting or varying the speed of a revolving surface with relation to a tool working upon such surface, with special reference to turning, spinning, and like mechanical operations where a tool is required to travel upon the revolving surface to be worked—as, for instance, in turning or spinning a spherical shape. The tool moves from the center of the sphere outward.
If the surface to be worked is revolving as rapidly as will do good work at the center—the surface velocity increases from that center outward—the speed would be too rapid, as the tool passes from the center outward. Hence it is customary to adopt a minimum speed, which shall not be too fast at the largest diameter; but in this arrangement so good work cannot be done as would be the case were the surface velocity the same throughout—that is, with relation to the tool. The same difficulty exists in turning, spinning, or working a flat revolving surface, the speed increasing from the center outward, as on the spherical surface.

The object of my invention is a mechanical movement which will automatically vary the revolving surface with relation to the tool or thing traveling over that surface, whereby a uniform surface velocity will be attained from the center outward; and in such an apparatus my invention consists.

In illustrating my invention I show it as applied to a common engine-lathe and the mechanism for varying speed as produced by a pair of frustum-shaped drums, and in Figs. 1 and 2 as employed for working upon a spherical surface.

A represents the bed, of usual construction, having at one end a mandrel, B, arranged in bearings C, and provided with pulleys D, in the usual manner; E, the tool-carriage, arranged to slide on the bed, and moved longitudinally by means of a train of gearing, in connection with the mandrel, through a leading screw or rod, F, in the usual manner, this particular mechanism constituting no part of my invention.

G represents a spherical body or thing the surface of which is to be worked upon, and which is arranged and secured in the mandrel in the usual manner for securing such articles.

H is a frustum-of-cone-shaped drum, arranged upon a counter-shaft, I, with pulleys K, from which a belt leads to the pulleys on the mandrel.

L is a second frustum-of-cone-shaped drum, substantially like the drum H, and arranged upon a shaft, M, parallel with the shaft I, but its base or larger diameter opposite to that of the first drum, H, as seen in Fig. 2, with a belt, N, running from one drum to the other. Power, being applied to the shaft N, is communicated from the drum L to the drum H, and thence to the mandrel. The revolution of the upper or driving shaft M is constant. If the belt stand at the larger diameter of that drum L, it will communicate its surface velocity to the smaller end of the drum H, causing a rapid revolution to that drum; but if the belt be at the opposite or smaller end of the drum L, then it will operate upon the larger diameter of the drum H, communicating the surface velocity thereto, causing the said drum H to run proportionately slower than it did with the belt at the opposite end. The velocity of the drum H will therefore vary between these two drums according to the position which the belt occupies along its surface.

P is a shipper-bar, arranged in suitable supports, P', to engage the belt, here represented as by a fork, P², extending up from the shipper.

R is a vertical shaft extending up at the rear of the lathe, and upon which is a segment, R'. This segment is connected to the shipper by a cord, r, attached to the shipper, and extending to one end, r', of the segment and there secured, and by a second cord, r³, attached to the shipper upon the other side of the segment, and extending around and secured to the opposite end, r', of the segment, so that if the segment be turned in one direction it will move the shipper in that direction, or vice versa, such movement of the segment imparting a corresponding movement to the belt. On the rear side of the lathe is a longitudinal shaft, S, arranged for free revolution in suitable bearings, S'. On this shaft is a bevel-pinion, S², working into a corresponding pinion, S³, on the vertical shaft R.

On the shaft S a pinion, T, is arranged free to move longitudinally on said shaft, but so as to revolve with the shaft, as by a spline and groove or otherwise, and stands between two arms, e e, which extend from the rear end of the carriage, so that as the carriage moves longitudinally on the bed of the lathe the pinion will be correspondingly moved along its shaft.

On the carriage at the rear, and in suitable guides, is a toothed rack, T', which works in the pinion on the shaft S. a is the tool holder, hung upon the carriage, so as to swing in a horizontal plane upon a center, a', in line with the vertical axis of the spherical surface to be turned, and in the usual manner for such tool stocks or holders in ball or spherical turning or spinning machines.

Concentric with the axis on which the tool-holder rotates is a toothed wheel, a², which works into a corresponding pinion, a³, on the carriage, so that as the tool holder is turned to vary the spherical surface the wheel a³ will be correspondingly turned. The wheel a³ is in connection with the rack T by means of a stud, a⁴, working in a transverse slot, a⁵, in the said rack. Hence as the wheel a³ is rotated, as before described, it will impart a corresponding forward or back movement to the rack, and this forward and back movement of the rack will impart a corresponding rotation to the pinion T and shaft S, which will be communicated to the belt-shipper.

To illustrate the operation, suppose the tool stand in the position as indicated in broken lines, Fig. 2, and is to be moved outward, and from that point onto the larger diameter, and suppose that, standing at that point, a belt be in the position (also indicated in Fig. 2) at about midway of the length of the two drums, the rack T' will then stand in the position as indicated in broken lines. Now, if the tool be moved around toward the larger diameter, it will draw the rack forward, turning the shaft S, and carry the belt toward the smaller diameter of the drum L and larger diameter of the drum H, which will diminish the revolution of the shaft I, and correspondingly of the mandrel and the surface travel of the spherical-shaped article G. The proportion of the drums corresponding, the same surface travel will be imparted to the spherical surface from the center outward to the larger diameter, giving to the tool working above the surface a quick action throughout the surface over which it works. Suppose, for further illustration, the surface to be worked upon is that seen in Fig. 3, G representing that flat surface. In this case the tool will travel transversely, or at right angles to the lathe-mandrel, in the usual manner for turning or working upon such surfaces. The rack T in that case will travel forward and back with the carriage and impart corresponding movement to the shaft S, thence to the shipper, as before described. These illustrations are sufficient to enable those skilled in the various arts to which this device is adapted to apply it.

Instead of the rack and pinion on the shaft S working through the shipper, as I have thus far described, the shipper-fork P² may be arranged upon a leading-screw, d, (see Fig. 4,) and that screw cause revolution by direct connection with the mechanism of the lathe, which also imparts to the tool its travel over the surface worked, in the usual manner, so that, the tool starting from the center and working outward, or vice versa, the belt will be correspondingly moved along the drums to vary the speed of the surface over which the tool passes, and so as to maintain substantially a uniform surface velocity throughout the movement of the tool. I therefore do not wish to be understood as limiting my invention to a particular mechanism between the belt-shipper and the tool, whereby the surface velocity being worked upon is automatically varied.

While I prefer the frustum-of-cone-shaped drums as being the most convenient method of varying the velocity of the driving-pulleys, other equivalent mechanism may be employed— as, for instance, as seen in Fig. 5. In this case the shaft I, on which are the pulleys K, is arranged to be moved longitudinally through the said pulleys. A spline in the pulleys works in a longitudinal groove in the shaft in the usual manner for spline and grooved shaft and pulleys, and to this shaft I the segment R is attached in like manner as described for attachment to the shipper, and on the shaft I is a pulley, I', which traverses upon the face of a revolving disk, L', arranged upon the shaft M. The power is applied as before, the shaft M being in this case at right angles to the shaft I, instead of parallel thereto, as in the case of the conical-shaped drums, and so that as the shaft I is moved longitudinally the pulley I' will travel radially on the face of the revolving disk L', and in such frictional contact therewith that the revolution of the disk L will be imparted through the pulley I' to the shaft I, thence to the thing to be revolved, as before described. The velocity with which the pulley I' will revolve depends upon its position on the face of the disk L'—as, for instance, at the center it would be substantially still, then as it is moved from that point outward the increase in velocity reaching its maximum at the extreme outer edge of the disk; but as in case of cone-pulleys the adjustment of the pulley I' to thus vary the revolution is produced by the tool stock or holder—that is to say, according as the position of the tool is varied on the surface of the thing being operated upon the speed with which that thing revolves is automatically and correspondingly varied.

I do not wish to be understood as confining myself to the particular mechanism for varying the speed of the thing being driven, it only being essential that whatever that mechanism is it shall be connected with the tool or its holder, that by the movement of that tool or its holder over the surface of the thing to be operated upon it shall actuate the adjusting mechanism to produce the variation in the velocity of the thing being so operated by the tool.

I claim—

1. The combination of the following elements: mechanism to support and impart revolution to the thing to be operated upon, a tool-holder carrying the tool to work upon the surface of the thing so held and revolving, mechanism, substantially such as described, to vary the velocity with which said thing is revolved, and mechanism, substantially such as described, communicating from said tool-holder to said velocity-varying mechanism, whereby the surface velocity of the thing being worked upon is automatically varied according to the position of the tool upon said surface, from its smaller to its larger diameter, or vice versa, substantially as described.

2. The combination of the following elements: mechanism to support and impart revolution to the thing to be operated upon, a tool-holder carrying the tool to work upon the surface of the thing so held and revolving, mechanism, substantially such as described, to vary the velocity with which said thing is revolved, said tool-holder arranged upon a carriage for transverse movement at substantially right angles to the axis of revolution of the thing to be operated upon, a rack attached to and movable with said carriage, a longitudinal shaft provided with a pinion, with which the said rack engages to impart a rotation to said shaft corresponding to the transverse movement of the tool-carrying carriage, and mechanism, substantially such as described, between said shaft and the said velocity-varying mechanism, whereby the surface velocity of the thing being worked upon is automatically varied according to the position which the tool occupies upon the surface to be worked upon, from its smaller to its larger diameter, or vice versa, substantially as described.

3. The combination of the following elements: mechanism to support and impart revolution to the thing to be operated upon, a tool-holder carrying the tool to work upon the surface of the thing so held and revolving, mechanism, substantially such as described, to vary the velocity with which the said thing is revolved, said tool-holder hung upon a pivot to swing in a plane parallel with the axis of revolution of the thing being worked upon, a rack in connection with said tool-holder by mechanism substantially such as described, whereby the rotation of the tool-holder imparts a movement to said rack in a plane at right angles to the axis of revolution of the thing being worked upon, a longitudinal shaft provided with a pinion, with which said rack engages to impart to said shaft a rotation corresponding to the movement of said rack, and mechanism, substantially such as described, between said shaft and the velocity-varying mechanism, whereby the surface velocity of the thing being worked upon is automatically varied from its smaller to its larger diameter, according to the position which the tool occupies upon the surface to be worked upon, from its smaller to its larger diameter, or vice versa, substantially as described.

HORACE LORD.

Witnesses:
EDW. J. MURPHY,
WM. MASON.